United States Patent
Iyer et al.

(10) Patent No.: US 9,959,426 B2
(45) Date of Patent: *May 1, 2018

(54) METHOD AND APPARATUS FOR SPECIFYING TIME-VARYING INTELLIGENT SERVICE-ORIENTED MODEL

(71) Applicant: INTERNATIONAL BUSINESS MACHINES CORPORATION, Armonk, NY (US)

(72) Inventors: Sreekanth R. Iyer, Bangalore (IN); Sandeep R. Patil, Vimannagar (IN); Sri Ramanathan, Lutz, FL (US); Gandhi Sivakumar, Bentleigh (AU); Matthew B. Trevathan, Roswell, GA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/428,545

(22) Filed: Feb. 9, 2017

(65) Prior Publication Data

US 2017/0154192 A1 Jun. 1, 2017

Related U.S. Application Data

(63) Continuation of application No. 15/008,998, filed on Jan. 28, 2016, now Pat. No. 9,621,557, which is a
(Continued)

(51) Int. Cl.
*H04L 29/06* (2006.01)
*G06F 21/62* (2013.01)
(Continued)

(52) U.S. Cl.
CPC ....... *G06F 21/6245* (2013.01); *G06Q 30/016* (2013.01); *G06Q 30/04* (2013.01)

(58) Field of Classification Search
CPC ... G06F 21/6245; G06Q 30/016; G06Q 30/04
(Continued)

(56) References Cited

U.S. PATENT DOCUMENTS 5,450,593 A * 9/1995 Howell ............... G06F 21/6218
340/5.28
5,991,877 A * 11/1999 Luckenbaugh ..... G06F 21/6218
707/999.005
(Continued)

OTHER PUBLICATIONS

IBM, "Message Oriented SOA Component Process Model", IP.com Prior Art Database, May 17, 2006, 7 pages.
(Continued)

*Primary Examiner* — Michael S McNally
(74) *Attorney, Agent, or Firm* — Christopher K. McLane; Andrew M. Calderon; Roberts Mlotkowski Safran Cole & Calderon, P.C.

(57) ABSTRACT

A method and an apparatus for specifying a time-varying, intelligent service-oriented model are provided. A method implemented in a computer infrastructure having computer executable code embodied on a computer readable storage medium having programming instructions, includes defining information of a service which is to be provided to one or more users having access to a system storing the defined information. The method further includes defining policies associated with the defined information to allow and deny access to selected portions of the defined information, and exposing to a user of the one or more users the selected portions of the defined information based on the defined policies allowing access to the selected portions of the defined information.

13 Claims, 8 Drawing Sheets

Related U.S. Application Data continuation of application No. 14/524,002, filed on Oct. 27, 2014, now Pat. No. 9,282,123, which is a continuation of application No. 13/173,699, filed on Jun. 30, 2011, now Pat. No. 8,893,217.

(51) Int. Cl.
  *G06Q 30/00* (2012.01)
  *G06Q 30/04* (2012.01)

(58) Field of Classification Search
  USPC .......................................................... 726/30
  See application file for complete search history.

(56) References Cited

U.S. PATENT DOCUMENTS

| | | | |
|---|---|---|---|
| 7,792,795 | B1 | 9/2010 | Swartz et al. |
| 2002/0162029 | A1* | 10/2002 | Allen ............. H04L 29/06 726/21 |
| 2006/0112424 | A1* | 5/2006 | Coley ............ G06Q 20/027 726/11 |
| 2007/0100790 | A1 | 5/2007 | Cheyer et al. |
| 2007/0295799 | A1* | 12/2007 | Chibel ............ G06Q 10/08 235/375 |
| 2008/0168423 | A1 | 7/2008 | Daskal et al. |
| 2009/0024705 | A1* | 1/2009 | Rama Rao ........ G06Q 10/00 709/206 |
| 2009/0083051 | A1* | 3/2009 | Bokor ............ G06Q 30/06 705/1.1 |
| 2009/0165146 | A1* | 6/2009 | Wenzlik .......... G07C 9/00166 726/28 |
| 2010/0031138 | A1 | 2/2010 | Ling et al. |
| 2012/0102224 | A1 | 4/2012 | Mercuri |

OTHER PUBLICATIONS

Zacarias et al., "Modeling Contexts for Business process Oriented Knowledge Support", 2004-2005, 8 pages.
Saidani et al., "Towards Context Aware Business Process Modelling", 2005, 9 pages.
Callison, "A Time-Sensitive Object Model for Real-Time Systems", ACM Transactions on Software Engineering and Methodology, vol. 4, No. 3, Jul. 1995, pp. 287-317.
Frihida et al., "Spatio-Temporal Object-Oriented Data Model for Disaggregate Travel Behavior", Transations in GIS, 2002, pp. 277-294.

* cited by examiner

METHOD AND APPARATUS FOR SPECIFYING TIME-VARYING INTELLIGENT SERVICE-ORIENTED MODEL

TECHNICAL FIELD

The present invention generally relates to an information technology (IT) environment model, and more particularly, to a method and an apparatus for specifying a time-varying, intelligent service-oriented model.

BACKGROUND

The Common Information Model (CIM) is an information technology (IT) environment model that defines how managed elements are represented as a set of objects and the relationships between them. The CIM allows consistent management of these managed elements. More specifically, every object in the CIM has its structural behavior specified through its attributes (e.g., types), operations on the attributes, and relationships with other objects. For example, an object can include a type attribute of an address, a billing address, and/or a service address that is set by a user, and can be linked to another object including a similar type attribute.

However, the CIM imposes a constraint that every object is static. In other words, every object and its attributes and relationships are unchanged until updated by a user. Accordingly, in a system or service using the CIM, a manifestation of one object (e.g., service address) may require a manifestation of its attributes and relationships to another object (e.g., address), even though some of the attributes and relationships should not be exposed for security reasons. To prevent this unnecessary exposure, a system may require additional security layers that may filter the secure attributes and relationships and/or may restrict access of a particular user to the secure attributes and relationships. In addition, the static nature of objects in the CIM imposes the need to manifest more objects and relationships than necessary, from also a system efficiency and resources standpoint. For example, when a system needs to retrieve an object that is four nodes apart from a billing address object and/or three nodes apart from a service address object, all of the nodes between the needed object and the billing address object and/or the service address object may need to be manifested, which degrades system efficiency and takes up system resources. This excessive manifestation may occur even though only the relevant object needs to be manifested.

SUMMARY

In a first aspect of the invention, a method implemented in a computer infrastructure having computer executable code embodied on a computer readable storage medium having programming instructions, includes defining information of a service which is to be provided to one or more users having access to a system storing the defined information. The method further includes defining policies associated with the defined information to allow and deny access to selected portions of the defined information, and exposing to a user of the one or more users the selected portions of the defined information based on the defined policies allowing access to the selected portions of the defined information.

In another aspect of the invention, a system is implemented in hardware which includes a computer infrastructure operable to create a business object of a service provided to one or more users, and define a context component of the business object for manifestation of the business object. The context component includes at least one time period when the business object is manifested to the one or more users. The computer infrastructure is further operable to manifest the business object when a current time is within the at least one time period.

In an additional aspect of the invention, a computer program product includes a computer usable storage medium having readable program code embodied in the storage medium. The computer program product includes at least one component operable to define information of a service which is to be provided to one or more users having access to a system storing the defined information. The at least one component is further operable to define policies associated with the defined information to allow and deny access to selected portions of the defined information, and expose to a user of the one or more users the selected portions of the defined information based on the defined policies allowing access to the selected portions of the defined information.

In a further aspect of the invention, a method of specifying a time-varying, intelligent, service-oriented model, includes providing a computer infrastructure, which is operable to request a service port for accessing information of a service provided to one or more users, and request access of the information based on the service port. The computer infrastructure is further operable to access the information when the information is manifested based on parameters defined by the one or more users.

In another aspect of the invention, a computer system for specifying a time-varying, intelligent, service-oriented model is provided. The system includes a CPU, a computer readable memory and a computer readable storage media. First program instructions receive a request from a user to access information that is stored on a system. Second program instructions determine whether at least a first user and a second user are authorized to have access to the information based on defined rules as to time of retrieval. Third program instructions provide the first user access to a first type of the information when the first user is requesting access within the defined time of retrieval, while denying access to additional information stored on the system. Fourth program instructions provide the second user access to a second type of the information when the second user is requesting access within the defined time of retrieval, while denying access to remaining information stored on the system. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
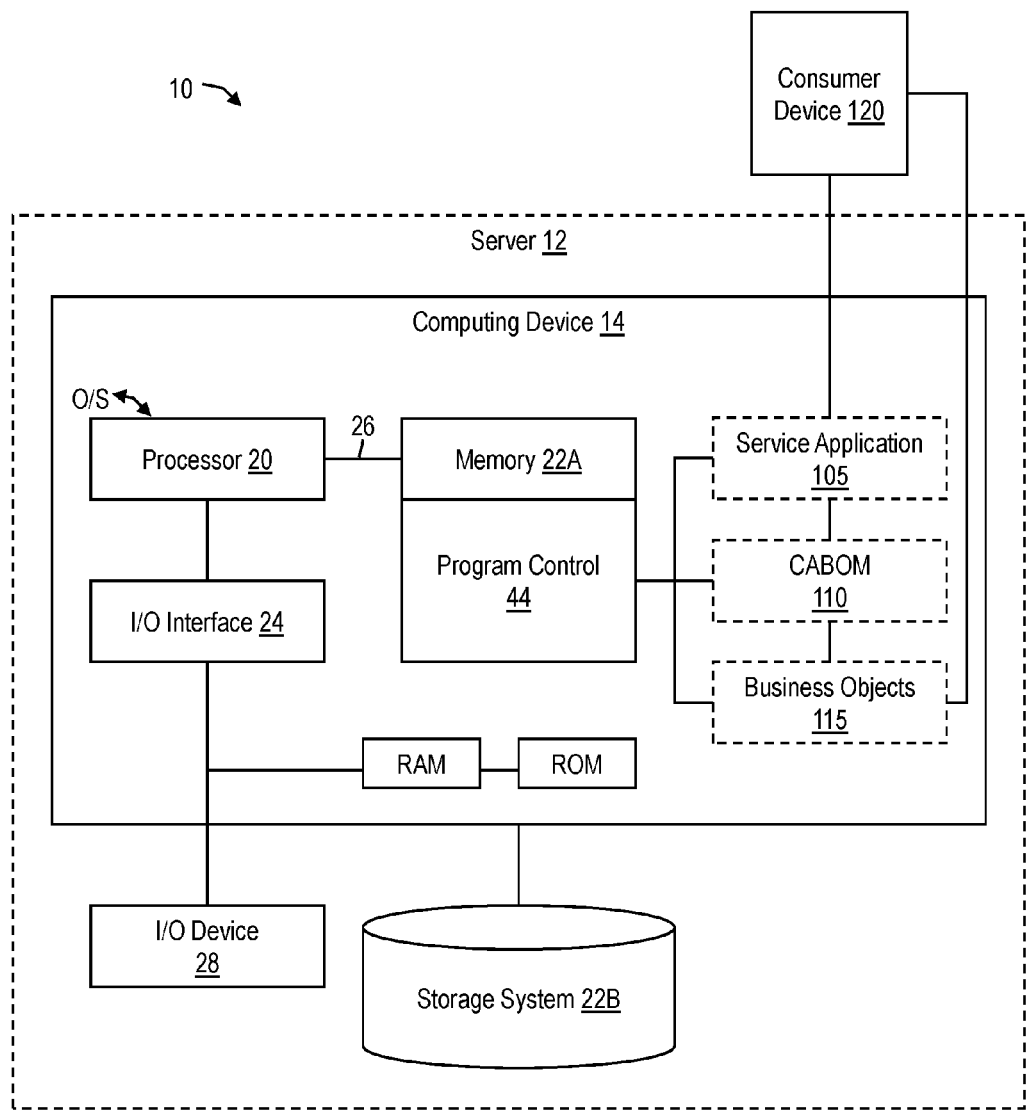
FIG. 1 shows an illustrative environment of a sever and/or a computing device for implementing the steps in accordance with aspects of the invention.

The present invention generally relates to an information technology (IT) environment model, and more particularly, to a method and an apparatus for specifying a time-varying, intelligent service-oriented model. In embodiments, the present invention allows a user, while using a service via a consumer device, to request to create one or more business objects. In embodiments, these business objects may include any element or information of the service, such as an address of the user. The user request is transferred from the consumer device to a Context Aware Business Object Modeler (CABOM), which creates the business objects. Each of the business objects may include attributes and relationships. For example, when one of the business objects includes an address of the user, attributes may include a street number and a street name, and relationships may include a link to at least one other business object, such as a billing address object and/or a service address object.

In accordance with further aspects of the invention, the present invention enables time-intelligent objects. More specifically, during creation of the business objects, a user can specify context (e.g., policies) of the business objects. For example, the user may set object type information of one of the business objects, e.g., specify that a business object is to manifest as, for example, a billing address object and/or a service address object. Further, the user may set time information of the business object, e.g., specify that the business object manifest, or be exposed, to particular users within particular time periods. In addition, the object type information and the time information may specify that specific attributes of the business object manifest within particular time periods, e.g., attributes "a" and "b" manifest in a first time period, while attributes "c" and "d" manifest in a second time period. In other words, the CABOM may perform a time-varying manifestation of the business objects, attributes of the business objects, and/or relationships of the business objects. That is, the CABOM allows the behavior of the business objects to be based on the user-specified context.

Advantageously, the present invention provides a time-varying object model, instead of a static object model. The time-varying object model can increase security as the manifestation of business objects is more limited, e.g., at only certain times and/or while other business objects are hidden or not exposed to users. Also, via user-specified context of business objects, manifestation of the business objects may be limited to a more granular (e.g., attribute and/or relationship) level, instead of requiring all attributes and/or relationships to be exposed even though only relevant attributes and/or relationships are needed. This may also increase system security, while increasing system efficiency by decreasing the amount of business objects and attributes manifested.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM),an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a service application 105 and a Context Aware Business Object Modeler (CAB OM) 110, e.g., the processes described herein. The service application 105 and the CABOM 110 can be implemented as one or more program code in the program control 44 stored in memory 22A as separate or combined modules. Additionally, the service application 105 and the CABOM 110 may be implemented as separate dedicated processors or a single or several processors to provide the function of this tool. Moreover, it should be understood by those of ordinary skill in the art that the service application 105 and the CABOM 110 are used as general descriptive terms for providing the features and/or functions of the present invention, and that the service application 105 and the CABOM 110 may comprise many different components such as, for example, the components and/or infrastructure described and shown with reference to FIGS. 2-4.

In embodiments, the service application 105 can include any application or process engine that provides a service to a user. For example, the service application 105 may include a Reliability, Availability and Serviceability (RAS) application, a WebSphere® Integration Developer (WID) application, a WebSphere® Process Server (WPS) application, a WebSphere® Application Server (WAS) application, etc. WebSphere is a trademark of International Business Machines Corporation registered in many jurisdictions worldwide. The service application 105 may provide a service to a user via, e.g., a graphical user interface (GUI) of a consumer device 120, which can include, for example, a personal computer (PC), a laptop, a smartphone, etc.

While using the service via the consumer device 120, a user can request to create one or more business objects 115. In embodiments, these business objects 115 may include any element or information needed for the service to be provided and/or provided by the service, such as an address of the user. The user request is transferred from the consumer device 120 to the service application 105, and to the CABOM 110, which creates the business objects 115. Each of the business objects 115 may include attributes and relationships. For example, when one of the business objects 115 includes an address of the user, attributes may include a street number, street name, and a postal code of the address, and relationships may include a link to at least one other business object, such as a billing address object and/or a service address object. While the discussion herein mentions address information as an example of information included in business objects, any information may be contemplated by the present invention, e.g., invoice information, service information, telephone number information, office management information, etc.

In accordance with further aspects of the invention, the CABOM 110 enables creation time intelligent objects, which run on related time sensitive machines (TSM). More specifically, during creation of the business objects 115, a user can specify context of (e.g., policies associated with) the business objects 115. For example, when defining an address, the user may set object type information or context of one of the business objects 115, e.g., specify that a business object is to manifest as a billing address object and/or a service address object. The user may also set user information of one of the business objects 115, e.g., specify that one or more certain users are able to be manifested (e.g., to have access to) the business objects 115. Further, the user may set time information or context of the billing address object and/or the service address object, e.g., specify that the billing address object and/or the service address object manifest within particular time periods. In addition, the time information may specify that specific attributes of the billing address object and/or the service address object manifest within particular time periods, e.g., attributes "a" and "b" manifest in a first time period, while attributes "c" and "d" manifest in a second time period. In embodiments, the time information may specify that specific relationships of the billing address object and/or the service address object manifest within particular time periods. In other words, the CABOM 110 may perform a time-varying manifestation of the business objects 115, attributes of the business objects 115, and relationships of the business objects 115. That is, the CABOM 110 allows the behavior of the business objects 115 to be based on the user-specified context (e.g., policies). In embodiments, the business objects 115 and the context of the business objects 115 may be stored in the memory 22A and/or the storage system 22B.

Advantageously, the present invention provides a time-varying object model, instead of a static object model, to affect service-oriented architecture (SOA) behavior. The time-varying object model can increase security as the behavior is controlled by time, not through upper security layers. For example, a certain business object may be manifested or exposed within particular time periods, instead of at each particular object request, while other business objects may remain hidden from users. Limited manifestation of business objects may lead to increased security of business objects. Also, via user-specified context of business objects, manifestation of the business objects may be limited at a more granular (e.g., attribute, relationship, user) level, instead of requiring all attributes and/or relationships to be exposed even though only relevant attributes and/or relationships are needed. This may decrease the amount of business objects and attributes manifested and thus, increase system efficiency.

By way of example, a user x may request the service application 105 to create an address business object including attributes of an address, such as a street number and/or a street name. The user x may also request the address business object to have a defined context, e.g., time information indicating that the address business object should be manifested or exposed to users within a particular time period (between 8:00 PM and 10:00 PM). The service application 105 forwards the user request to the CABOM 110, which creates the address business object and defines the context of the address business object. When the CABOM 110 determines that a current time is within the particular time period, the CABOM 110 manifests the address business object to the users, e.g., to be requested for and retrieved by a user y. The CABOM 110 manifests the address business object to the users (e.g., the user y) for only the particular time period. Accordingly, the context allows the address business object to be retrieved by only certain users (e.g., the user y) at certain times, and to be hidden from such users at other times. In other words, the users get to see (request and retrieve) business objects that they need to see, and that they have permission to see.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
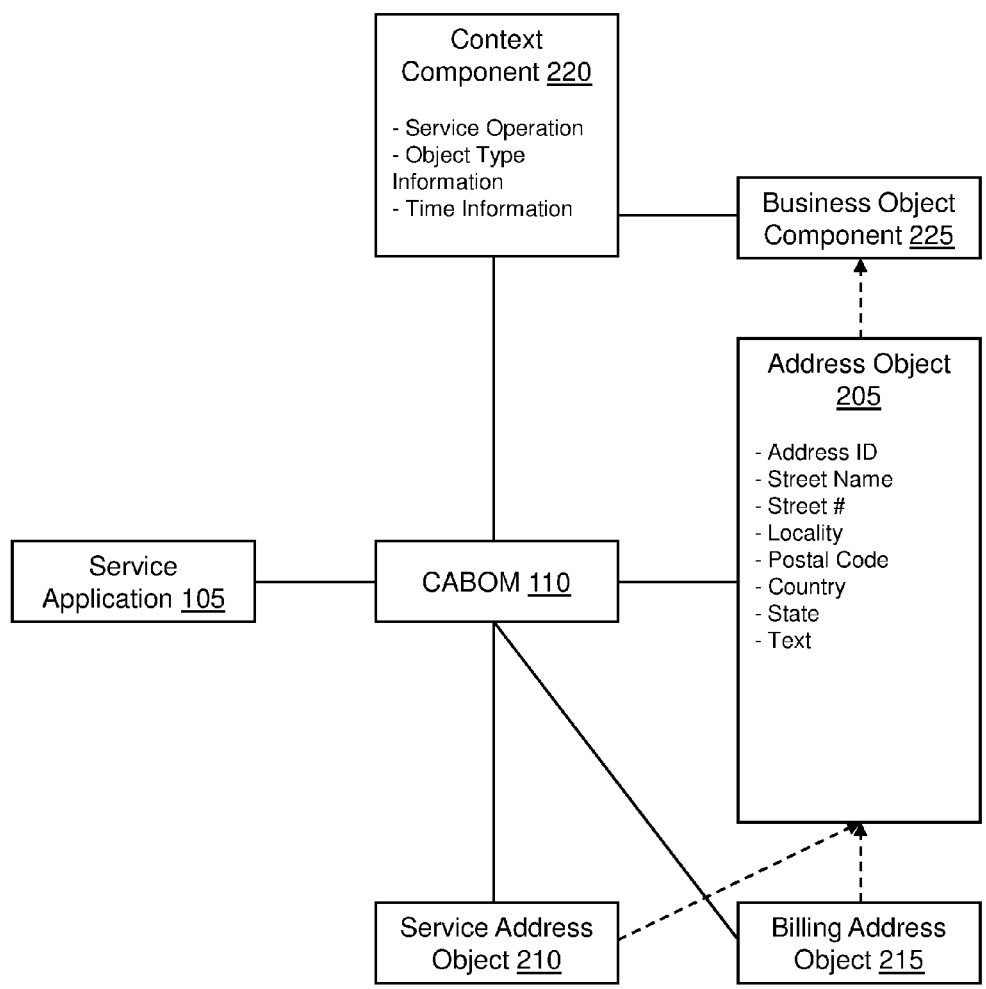
FIGS. 2-4 shows additional illustrative environments for implementing the steps in accordance with aspects of the invention.

FIG. 2 shows another illustrative environment 200 for implementing the steps in accordance with aspects of the invention. In embodiments, the environment 200 can include the service application 105, the CABOM 110, an address object 205, a service address object 210, a billing address object 215, a context component 220, and a business object component 225. The service application 105 and the CABOM 110 may include the service application 105 and the CABOM 110 in FIG. 1.

In embodiments, the service application 105 can include any application or process engine that provides a service to a user. For example, the service application 105 may include a Reliability, Availability and Serviceability (RAS) application, a WebSphere® Integration Developer (WID) application, a WebSphere® Process Server (WPS) application, a WebSphere® Application Server (WAS) application, etc. WebSphere is a trademark of International Business Machines Corporation registered in many jurisdictions worldwide. The service application 105 may provide a service to a user via, e.g., a graphical user interface (GUI) of a consumer device, e.g., the consumer device 120 in FIG. 1.

In accordance with further aspects of the invention, a user can request to create one or more business objects, e.g., the address object 205. In embodiments, these business objects may include any element or information needed for the service to be provided and/or provided by the service, such as an address of the user. The user request is transferred from the consumer device to the service application 105, and to the CABOM 110, which creates the business objects. While the discussion herein mentions business objects including exemplary address information, the present invention contemplates business objects to include any type of information may, e.g., invoice information, service information, telephone number information, office management information, etc. The created business objects may be stored in memory (e.g., the memory 22A in FIG. 2) and/or a storage system (e.g., the storage system 22B in FIG. 2).

In embodiments, the CABOM 110 can create the address object 205, which can include attributes and relationships of an address of the user. For example, the attributes of the address object 205 may include an address identifier (ID), a street name, a street number, a locality, a postal code, a country, a state, text, etc. The relationships of the address object 205 may include a link to the service address object 210 and the billing address object 215, where the address object 205 may inherit attributes of the service address object 210 and/or the billing address object 215.

In accordance with further aspects of the invention, the CABOM 110 may also create the service address object 210 and the billing address object 215, which may include attributes and relationships of a service address or a billing address of the user. The attributes of the service address object 210 and the billing address object 215 may include those similar to the attributes of the address object 205, e.g., the address ID, country, state, etc. The attributes of the service address object 210 and the billing address object 215 may also include different attributes, e.g., the billing address object 215 includes a post office (P.O.) box number, while the service address object 210 does not include a P.O. box number. The relationships of the service address object 210 and the billing address object 215 may include links to the address object 205, where the address object 205 may inherit the attributes of the service address object 210 and/or the billing address object 215.

In embodiments, based on the user request to create business objects, the CABOM 110 can define the context component 220 of (e.g., policies associated with) the business objects, e.g., the address object 205, the service address object 210, and/or the billing address object 215. The context component 220 allows the user to specify how the business objects should behave, namely, what attributes of the business objects are exposed and what operations can be performed on the business objects within particular time periods for possibly a specified set of users. For example, the context component 220 may include a service operation, object type information, time information, etc., to develop the runtime behavior of the business objects. The service operation may include an operator or function identifier (ID) that indicates an operation (e.g., read, manifest, or write a business object, and/or calculate an attribute of a business object) the CABOM 110 is to perform. The object type information may include an object type (e.g., service address and/or billing address, logical resource management and/or physical resource management), attributes, and/or relationships that an operation should be performed to or from. The time information may include, for example, a particular time period (e.g., between 6:00 PM to 8:00 PM) an operation should be performed. Each of the service operation, the object type information, and the time information may be defined when the address object 205, the service address 210, and/or the billing address object 215 are created. In another example, the context component 220 may include user information that indicates one or more users that may perform an operation associated with (e.g., access) the business objects.

For example, the context component 220 may include a service operation that indicates a manifest operation of the CABOM 110. The context component 220 may further include object type information of a service address, and time information of a particular time period between 6:00 PM to 8:00 PM. Accordingly, the context component 220 instructs the CABOM 110 to manifest the service address object 210 (and possibly the address object 205) between 6:00 PM to 8:00 PM. In another example, the context component 220 may include a service operation that indicates the manifest operation of the CABOM 110. The context component 220 may further include an object type information of a billing address, and time information of a particular time period between 8:00 PM to 10:00 PM. Accordingly, the context component 220 instructs the CABOM 110 to manifest the billing address object 215 (and possibly the address object 205) between 8:00 PM to 10:00 PM. The defined context component 220 may be stored in memory (e.g., the memory 22A in FIG. 2) and/or a storage system (e.g., the storage system 22B in FIG. 2).

In accordance with further aspects of the invention, based on the service address object 210 (and possibly the address object 205) and the context component 220, the CABOM 110 determines whether a current time is between the particular time period of 6:00 PM to 8:00 PM, for example. When the current time is between the particular time period, the CABOM 110 manifests the service address object 210 (and possibly the address object 205) based on the context component 220. Otherwise, the service address object 210 is hidden from or not exposed to users. Based on the billing address object 215 (and possibly the address object 205) and the context component 220, the CABOM 110 determines whether the current time is between the particular time period of 8:00 PM to 10:00 PM, for example. When the current time is between this time period, the CABOM 110 manifests (e.g., shows) the billing address object 215 (and possibly the address object 205) based on the context component 220. Otherwise, the billing address object 215 is hidden from or not exposed to users.

In embodiments, the address object 205, the service address object 210, and/or the billing address object 215 can be manifested into a business object component 225, which inherits the attributes and the relationships of the objects 205, 210, and/or 215. When service application 105 requests a business object from the CABOM 110, the CABOM 110 may return the business object component 225 to the service application 105, which may return or expose the business object component 225 to the user of the consumer device. Advantageously, the run time behavior of the address object 205, the service address object 210, and the billing address object 215 may be driven by the context component 220, imposing security and reaping system efficiency benefits.

Figure 3:
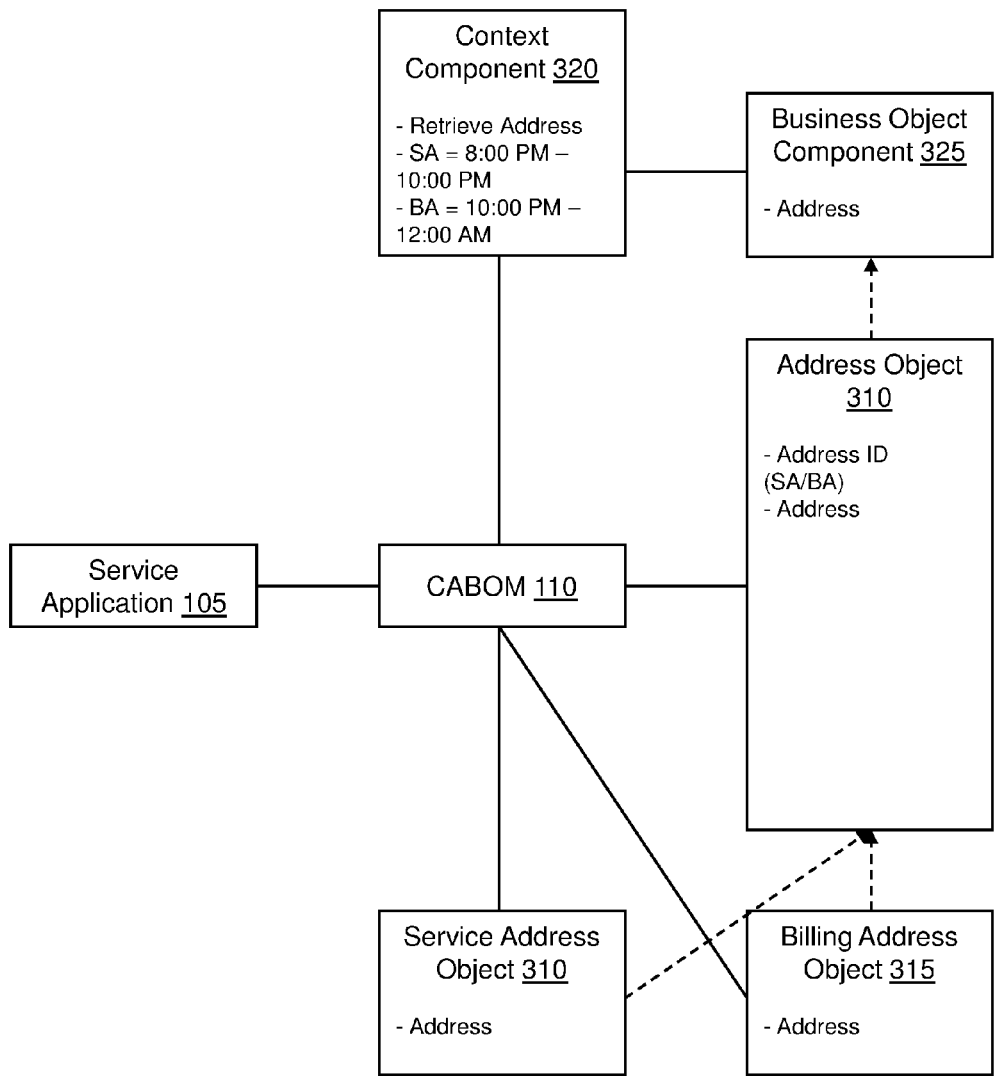

FIG. 3 shows another illustrative environment 300 for implementing the steps in accordance with aspects of the invention. In embodiments, the environment 300 can include the service application 105, the CABOM 110, an address object 305, a service address object 310, a billing address object 315, a context component 320, and a business object component 325. The service application 105 and the CABOM 110 may include the service application 105 and the CABOM 110 in FIG. 1. While the discussion herein mentions business objects including address information (e.g., the address object 305) as an example, the business objects of the present invention may include any type of information, e.g., invoice information, service information, telephone number information, office management information, etc.

In an exemplary operation of the present invention, the service application 105 sends to the CABOM 110 a user request to create the address object 305, the service address object 310, and/or the billing address object 315, and to define the context component 320 of the address object 305. Based on the user request, the CABOM 110 creates the address object 305, which includes attributes such as at least one address identifier (ID) and at least one address of the user. In embodiments, the address ID may include an ID of a service address (SA) type and/or a billing address (BA) type. The CABOM 110 may also create the service address object 310 and the billing address object 315, which include attributes such as at least one service address and at least one billing address, respectively, of the user. The CABOM 110 may create the address object 305, the service address object 310, and the billing address object 315 to include relationships with each other, e.g., indications that the address object 310 inherits the attributes of the service address object 310 and/or the billing address object 315. As it creates the address object 305, the service address object 310, and the billing address object 315, the CABOM 110 may prompt the user to link these objects 305, 310, 315 to the context component 320.

In embodiments, based on the user request, the CABOM 110 defines the context component 320. For example, the context component 320 can include a service operation of "Retrieve Address", which instructs the CABOM 110 to manifest or expose an address of the user for retrieval by the user via a consumer device (e.g., the consumer device 120 in FIG. 1). The context component 320 may further include object type information of the SA type, and time information of a particular time period between 8:00 PM to 10:00 PM. In addition, the context component 320 may include object type information of the BA type, and time information of a particular time period between 10:00 PM to 12:00 AM. Accordingly, the context component 320 instructs the CABOM 110 to manifest the service address of the user from 8:00 PM-10:00 PM, and to manifest the billing address of the user from 10:00 PM-12:00 AM.

In accordance with further aspects of the present invention, based on the time information of the context component 320, the CABOM 110 determines whether a current time is within the time period between 8:00 PM to 10:00 PM. If the current time is within this time period, the CABOM 110 manifests the service address of the user in the service address object 310. In embodiments, the CABOM 110 can manifest the service address by transferring the service address from the service address object 310 through the address object 305 and to the business object component 325. When the user requests the service address, the CABOM 110 may then return the business object component 325 through the service application 105 to the consumer device of the user. Alternatively or additionally, the CABOM 110 may manifest (e.g., pull) the service address object 310 and/or the business object component 325 such that the consumer device may directly access (e.g., request) the service address object 310 and/or business object component 325 for retrieval of the service address. When the current time is no longer within the time period between 8:00 PM to 10:00 PM, the CABOM 110 stops manifesting the service address object 310 and/or the business object component 325.

Advantageously, external consumers will not be made aware of or be able to access the service address after the time period as the manifestation of the service address will cease after the time period, ensuring strict security of the service address. In addition, during the time period, the CABOM 110 does not have to manifest the billing address and other attributes of the address object 305, thus reducing resource consumption. Instead, the context component 305 defines a direct access to the relevant attribute in the service address object 310. For example, the context component 305 may include object type information of the SA type and the relevant attribute in the service address object 310.

In embodiments, based on the time information of the context component 320, the CABOM 110 determines whether a current time is within the time period between 10:00 PM to 12:00 AM. If the current time is within this time period, the CABOM 110 manifests the billing address of the user in the billing address object 315. In embodiments, the CABOM 110 can manifest the billing address by transferring the billing address from the billing address object 315 through the address object 305 and to the business object component 325. When the user requests the billing address, the CABOM 110 may then return the business object component 325 through the service application 105 to the consumer device of the user. Alternatively or additionally, the CABOM 110 may manifest (e.g., pull) the billing address object 315 and/or the business object component 325 such that the consumer device may directly access (e.g., request) the billing address object 315 and/or business object component 325 for retrieval of the billing address. When the current time is no longer within the time period between 10:00 PM to 12:00 AM, the CABOM 110 stops manifesting the billing address object 315 and/or the business object component 325.

Advantageously, external consumers will not be made aware of or be able to access the billing address after the time period as the manifestation of the billing address will cease after the time period, ensuring strict security of the billing address. Further, during the time period, the CABOM 110 does not have to manifest the service address and other attributes of the address object 305, thus reducing resource consumption. Instead, the context component 305 defines a direct access to the relevant attribute in the billing address object 315.

Figure 4:
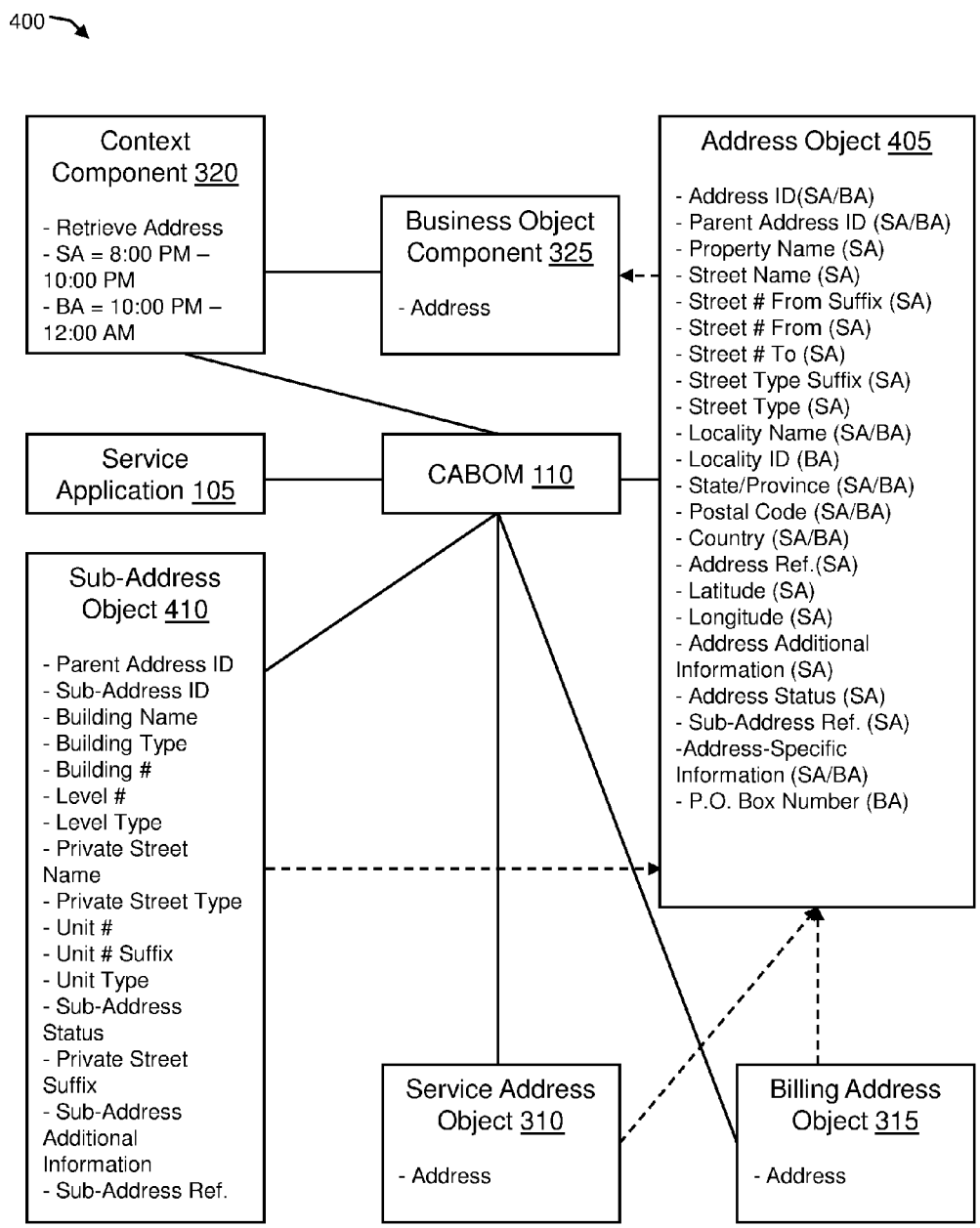

FIG. 4 shows another illustrative environment 400 for implementing the steps in accordance with aspects of the invention. In embodiments, the environment 400 can include the service application 105, the CABOM 110, the service address object 310, the billing address object 315, the context component 320, and the business object component 325. The service application 105 and the CABOM 110 may include the service application 105 and the CABOM 110 in FIG. 1. The service address object 310, the billing address object 315, the context component 320, and the business object component 325 may include the service address object 310, the billing address object 315, the context component 320, and the business object component 325 in FIG. 3. The environment 400 further includes an address object 405 and a sub-address object 410.

In an exemplary operation of the present invention, the service application 105 sends to the CABOM 110 a user request to create the address object 405, the service address object 310, the billing address object 315, and/or the sub-address object 410, and to define the context component 320 of the address object 405. Based on the user request, the CABOM 110 creates the address object 405, which includes attributes such as at least one address identifier (ID), a parent address ID, a property name, a street name, a "from" street number suffix, a "from" street number, a "to" street number, a street type suffix, a street type, a locality name, a locality ID, a state or province, a postal code, a country, a latitude, a longitude, address additional information, an address status, address-specific information, and a postal (P.O.) box number. Other information can be included. The address object 405 may further include relationships that relate the address object 405 to other business objects. For example, the address object 405 may include an address reference that may refer to the service address object 310 and/or the billing address object 315, and a sub-address reference that may refer to the sub-address object 410. In embodiments, each of the attributes and relationships of the address object 405 may include a service address ID (SA) and/or a billing address ID (BA) that indicate whether an attribute or relationship is an attribute or relationship of the service address object 305 and/or the billing address object 315, respectively.

In accordance with further aspects of the invention, the CABOM 110 may also create the sub-address object 410, which include attributes such as a parent address ID, a sub-address ID, a building name, a building type, a building number, a level number, a level type, a private street name, a private street type, a unit number, a unit number suffix, a unit type, a sub-address status, a private street suffix, and sub-address additional information. The sub-address object 410 may further include relationships that relate the sub-address object 410 to other business objects. For example, the sub-address object 410 may include a sub-address reference that refers to the address object 405, the service address object 310, and/or the billing address object 315.

In embodiments, the CABOM 110 may create the address object 405, the sub-address object 410, and the service address object 310, and the billing address object 315 to include relationships with each other, e.g., indications that the address object 405 inherits the attributes of the sub-address object 410, the service address object 310, and/or the billing address object 315. As it creates the address object 405, the sub-address object 410, the service address object 310, and the billing address object 315, the CABOM 110 may prompt the user to link these objects 405, 410, 310, 315 to the context component 320.

In embodiments, based on the user request, the CABOM 110 defines the context component 320. For example, the context component 320 can include a service operation of "Retrieve Address", which instructs the CABOM 110 to manifest or expose an address of the user for retrieval by the user via a consumer device (e.g., the consumer device 120 in FIG. 1). The context component 320 may further include object type information of a SA type, and time information of a particular time period between 8:00 PM to 10:00 PM. In addition, the context component 320 may include object type information of a BA type, and time information of a particular time period between 10:00 PM to 12:00 AM. Accordingly, the context component 320 instructs the CABOM 110 to manifest the service address of the user from 8:00 PM-10:00 PM, and to manifest the billing address of the user from 10:00 PM-12:00 AM.

In accordance with further aspects of the invention, the context component 320 may also instruct the CABOM 110 to manifest the attributes and relationships of the address object 405 related to the service address of the user from 8:00 PM-10:00 PM, and to manifest the attributes of the address object 405 related to the billing address of the user from 10:00 PM-12:00 AM. For example, when a current time is between 8:00 PM-10:00 PM, the CABOM 110 may manifest the service address object 310 and the related attributes of the address object 405, such as the property name, the street name and the "from" street number suffix. In another example, when the current time is between 10:00 PM-12:00 AM, the CABOM 110 may manifest the billing address object 315 and the related attributes of the address object 405, such as the P.O. box number. Depending on the object type information in the context component 320, the CABOM 110 may further manifest the attributes and relationships of the sub-address object 410 during particular time periods.

FIGS. 5-8 show exemplary flows for performing aspects of the present invention. The steps of FIG. 5-8 may be implemented in the environment of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Figure 5:
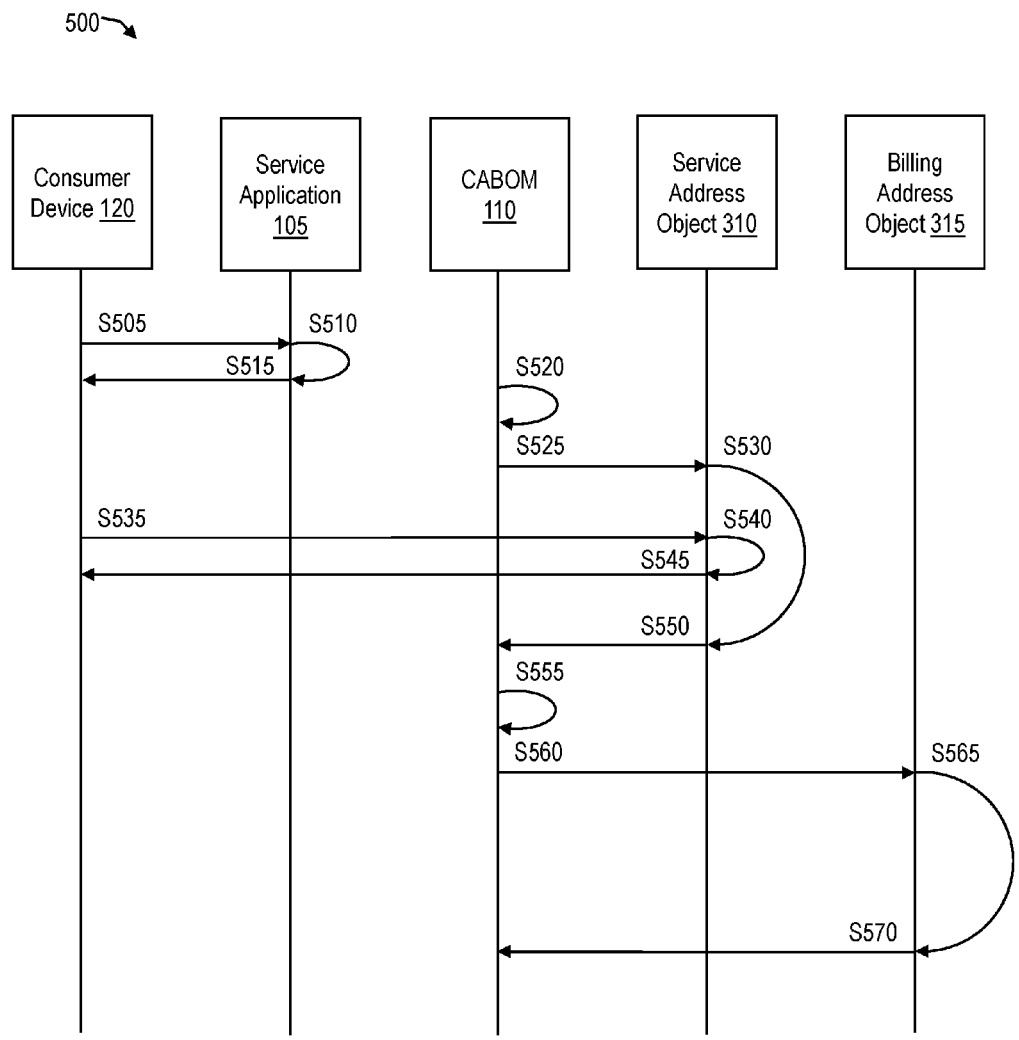
FIGS. 5-8 show exemplary flows for specifying a time-varying, intelligent service-oriented model in accordance with aspects of the invention.

FIG. 5 depicts an exemplary flow for a process 500 of specifying a time-varying, intelligent service-oriented model in accordance with aspects of the invention. The process 500 involves five players: the service application, the CABOM 110, and the consumer device 120 in FIG. 1, and the service address object 310 and the business address objet 315 in FIG. 3. At step S505, the process starts, and the consumer device 120 requests to retrieve a service port of the service address object 310 from the service application 105. At step S510, the service application 105 determines the service port of the service address object 310. At step S515, the service application 105 returns the service port of the service address object 310 to the consumer device 120.

At step S520, based on a context component (e.g., the context component 320 in FIG. 3) of the service address object 310, the CAB OM 110 determines whether a current time is within a particular time period (e.g., 8:00-10:00 PM), which is set as time information in the context component. If the current time is within the particular time period, then at step S525, the CABOM 110 instructs the service address object 310 to manifest or expose its attributes and relationships to at least the consumer device 120 based on the context component. At step S530, the service address object 310 manifests its attributes and relationships to at least the consumer device 120 based on the context component.

At step S535, the consumer device 120 requests at least one attribute (e.g., a service address) of the service address object 310. At step S540, the service address object 310 processes the request from the consumer device 120, and at step S545, the service address object 310 sends the request attribute to the consumer device 120. At step S550, the service address object 310 determines that the current time is no longer within the particular time period, stops manifesting the attributes and relationships, and informs the CABOM 110 that such attributes and relationships are no longer manifested.

At step S555, based on the context component (e.g., the context component 320 in FIG. 3) of the billing address object 315, the CABOM 110 determines whether the current time is within another particular time period (e.g., 10:00 PM-12:00 AM), which is set as the time information in the context component. If the current time is within the particular time period, then at step S560, the CABOM 110 instructs the billing address object 315 to manifest or expose its attributes and relationships to at least the consumer device 120 based on the context component. At step S565, the billing address object 315 manifest its attributes and relationships to at least the consumer device 120 based on the context component. At step S570, the billing address object 315 determines that the current time is no longer within the particular time period, stops manifesting the attributes and relationships, and informs the CABOM 110 that such attributes and relationships are no longer manifested. At step S570, the process ends.

Figure 6:
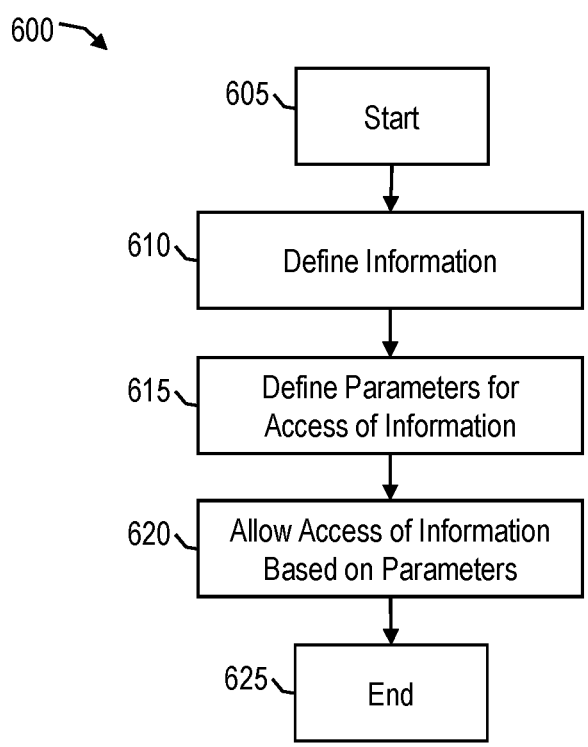

FIG. 6 depicts another exemplary flow for a process 600 of specifying a time-varying, intelligent service-oriented model in accordance with aspects of the invention. In embodiments, the process 600 can be performed by a Context Aware Business Object Modeler (CABOM), for example, the CABOM 110 in FIGS. 1-4. At step 605, the process starts.

At step 610, the CABOM defines information of a service and/or a service provider. For example, the CABOM can create a business object (e.g., the address object 205, the service address object 210, and/or the billing address object 215 in FIG. 2) of the information, including attributes (e.g., an address of a user and/or other information) and relationships. At step 615, the CABOM defines parameters for access (e.g., read and/or write) of the defined information by one or more users. For example, the CABOM can define a context component (e.g., the context component 220 in FIG. 2) of the business object, including a service operation, object type information (e.g., a service address object type and/or a billing address object type that is manifested or exposed), and time information (e.g., a particular time period when the business object is manifested).

At step 620, the CABOM allows access of the information based on the defined parameters. For example, the CABOM can determine whether a current time is within a particular time period (e.g., 8:00 PM-10:00 PM) defined in the time information of the context component. If the current time is within the particular time period, the CABOM manifests the business object to at least a service application and/or a consumer device of a user (e.g., the service application 105 and the consumer device 120 in FIG. 1) such that the user may access the business object. In embodiments, the CABOM may manifest the business object by transferring the at least one attribute from the business object to a business object component (e.g., the business object component 325 in FIG. 3). When a user requests the attribute, the CABOM may then return the business object component through the service application to the consumer device. Alternatively or additionally, the CABOM may manifest (e.g., pull) the business object and/or the business object component such that the consumer device may directly access (e.g., request) the business object and/or business object component. At step 625, the process ends.

Figure 7:
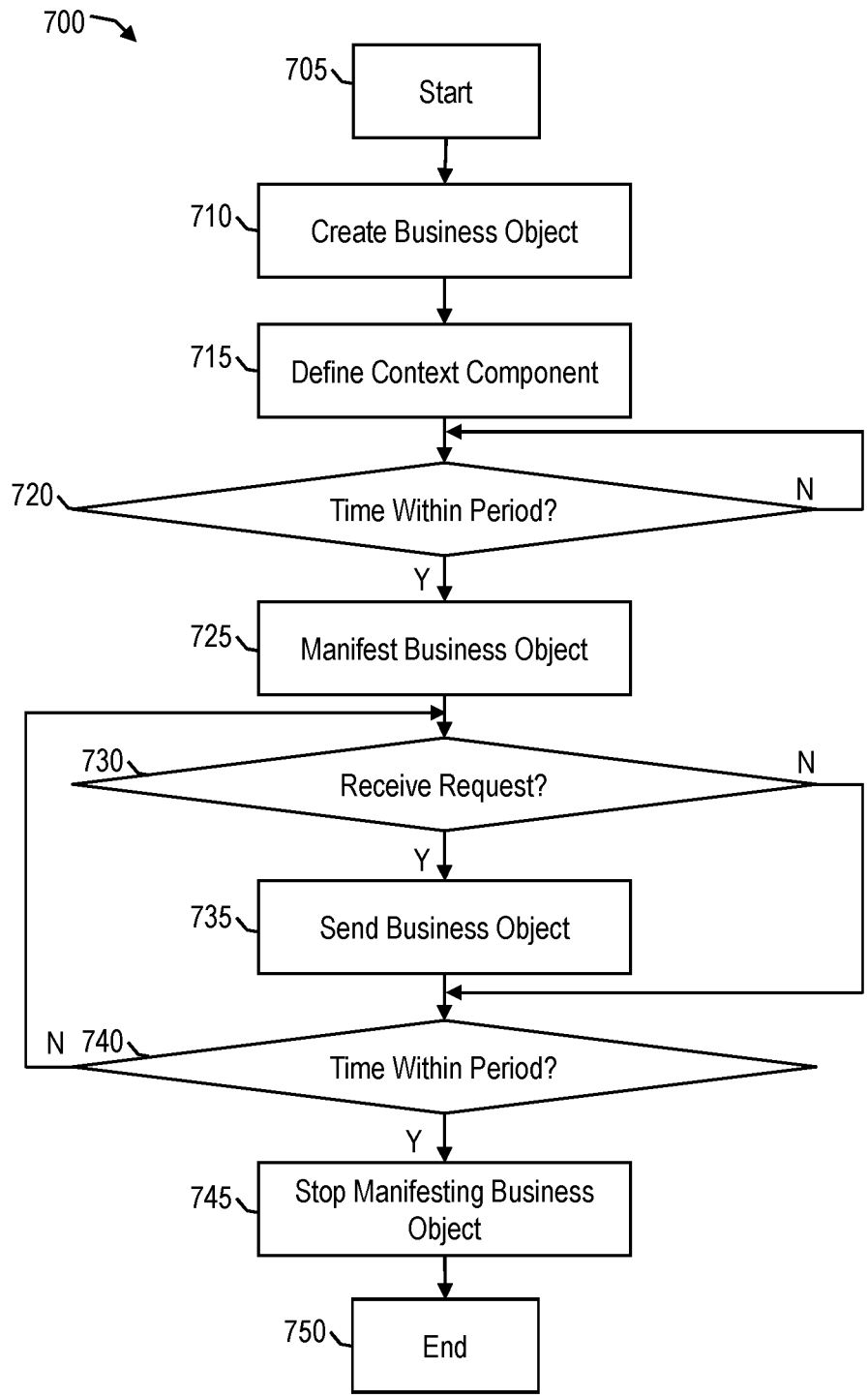

FIG. 7 depicts another exemplary flow for a process 700 of specifying a time-varying, intelligent service-oriented model in accordance with aspects of the invention. In embodiments, the process 700 can be performed by a Context Aware Business Object Modeler (CABOM), for example, the CABOM 110 in FIGS. 1-4. At step 705, the process starts.

At step 710, the CABOM creates a business object (e.g., the address object 205, the service address object 210, and/or the billing address object 215 in FIG. 2) including attributes and relationships. At step 715, the CABOM defines a context component (e.g., the context component 220 in FIG. 2) of the business object, including a service operation, object type information (e.g., a service address object type and/or a billing address object type), and time information (e.g., a particular time period when the business object is manifested or exposed). At step 720, the CABOM determines whether a current time is within a particular time period (e.g., 8:00 PM-10:00 PM) defined in the time information of the context component. If the current time is within the particular time period, the process continues at step 725. Otherwise, the process returns to step 720.

At step 725, the CABOM manifests the business object to at least a service application and/or a consumer device of a user (e.g., the service application 105 and the consumer device 120 in FIG. 1). In embodiments, the CABOM can manifest the business object by transferring the at least one attribute from the business object to a business object component (e.g., the business object component 325). When the user requests the attribute, the CABOM may then return the business object component through the service application to the consumer device. Alternatively or additionally, the CABOM may manifest (e.g., pull) the business object and/or the business object component such that the consumer device may directly access (e.g., request) the business object and/or business object component for retrieval of the attribute.

At step 730, the CABOM determines whether the user request has been received. If the user request has been received, the process continues at step 735. Otherwise, the process continues at step 740. At step 735, the CABOM sends the business object to the service application, which may subsequently send the business object to the consumer device. At step 740, the CABOM again determines whether the current time is within the particular time period defined in the time information of the context component. If the current time is still within the particular time period, the process returns to step 730. Otherwise, the process continues at step 745. At step 745, the CABOM stops manifesting the business object to at least the service application and/or the consumer device. At step 750, the process ends.

Figure 8:
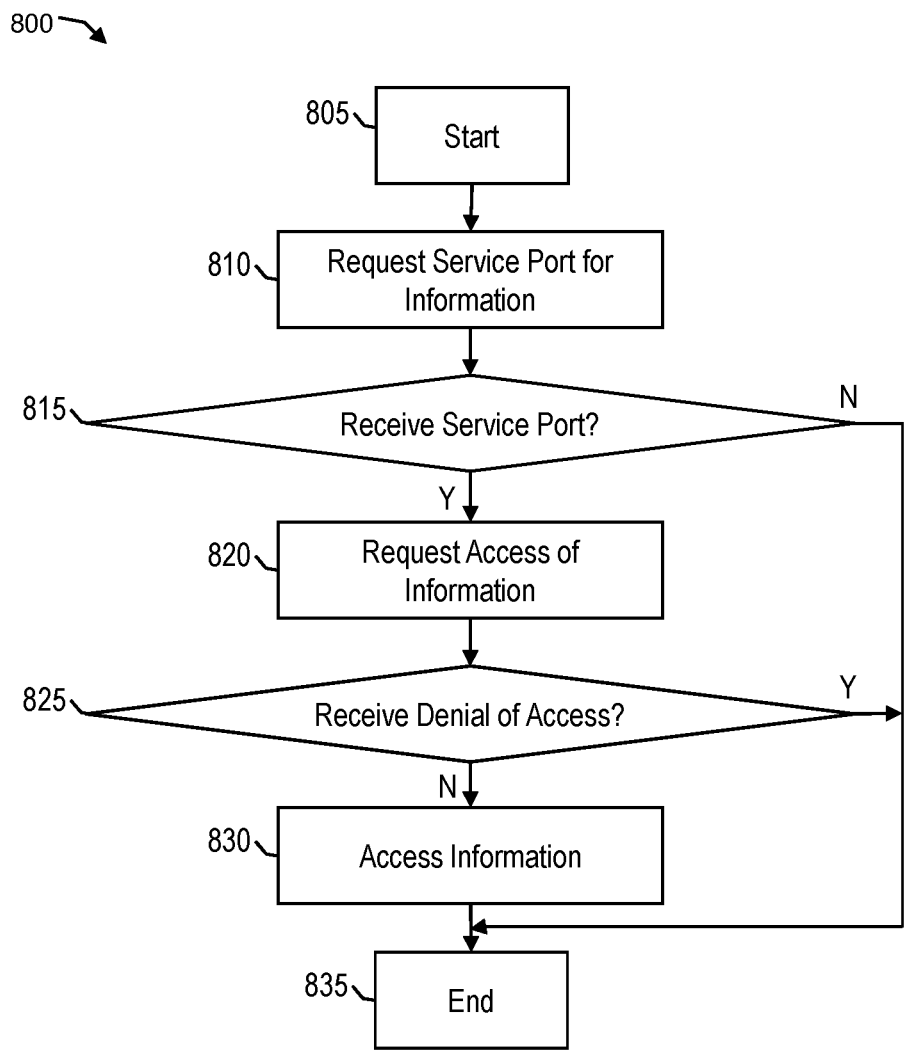

FIG. 8 depicts another exemplary flow for a process 800 of accessing a time-varying, intelligent service-oriented model in accordance with aspects of the invention. In embodiments, the process 800 can be performed by a consumer device, for example, the consumer device 120 in FIGS. 1 and 5. At step 805, the process starts.

At step 810, the consumer device requests a service port for accessing information of a service, from a service application (e.g., the service application 105 in FIG. 1), for example. In embodiments, the information can include a business object (e.g., the address object 205, the service address object 210, and/or the billing address object 215 in FIG. 2) with attributes (e.g., an address of a user and/or other information) and relationships. At step 815, the consumer device determines whether it receives the service port. If the consumer device receives the service port, the process continues at step 820. Otherwise (e.g., the consumer device does not receive the service port within a predetermined period of time and/or the consumer device receives a message from the service application that denies access to the information), the process ends at step 835.

At step 820, the consumer device requests access (e.g., read and/or write) of the information from the services application and/or from directly the business object. At step 825, the consumer device determines whether it receives a message from, e.g., the service application, that denies access to the information for one of various reasons, such as the requested information is not manifested or exposed at a current time and/or a particular type of the requested information is not manifested. In embodiments, the requested information may not be manifested due to parameters of information access previously defined by a user (e.g., the context component 220 in FIG. 2). If the consumer device does not receive the access denial message, the process continues at step 830. Otherwise, the process ends at step 835. At step 830, the consumer device accesses the information directly and/or through the service application. At step 835, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method comprising:
    defining information of a service which is to be provided to one or more users having access to a system storing the defined information; and
    permitting, by a processor, a user of the one or more users with access to the selected portions of the defined information based on defined policies identifying that the user of the one or more users is permitted to access the selected portions of the defined information, wherein:
        the defined information is contained in at least one business object; and
        the defined policies are associated with the defined information and comprise time information of the at least one business object, the time information specifying one or more time periods when the user is permitted to access to the selected portions of the defined information.

2. The method of claim 1, wherein the defined policies comprise at least one service operation which the user is allowed to perform on the defined information.

3. The method of claim 1, wherein the defined policies comprise at least one type of information of the defined information which the user is permitted to access, while denying access to another type of information of the defined information.

4. The method of claim 1, wherein the defined information and the defined policies are defined by at least one of the one or more users and a service provider.

5. The method of claim 1, wherein the at least one business object comprises at least one of:
    one or more attributes of the one or more users; and
    one or more relationships between the at least one business object and other business objects.

6. The method of claim 5, wherein the defined policies comprise at least one attribute of the one or more attributes that the user is permitted to access.

7. The method of claim 5, wherein the defined policies comprise at least one relationship of the one or more relationships that the user is permitted to access.

8. The method of claim 1, wherein:
    the defined policies associated with the business object comprise type information, the type information including a first type and a second type;
    the selected portions of the defined information include a first attribute of the first type and a second attribute of the second type;
    the selected portions of the defined information include a first relationship to the first attribute and a second relationship to the second attribute;
    the time information specifies that the user is permitted to access to the first attribute during a first time period of the one or more time periods; and
    the time information specifies that the user is permitted access to the second attribute during a second time period of the one or more time periods.

9. The method of claim 1, wherein the exposing the selected portions of the defined information comprises:
    manifesting, based on the time information and the type information, the first attribute and the first relationship to a device of the user when a current time is within the first time period;
    stopping manifesting the first attribute and the first relationship when the current time is no longer within the first time period;
    manifesting, based on the time information and the type information, the second attribute and the second relationship to the device of the user when the current time is within the second time period; and
    stopping manifesting the second attribute and second relationship when the current time is no longer within the second time period.

10. The method of claim 9, wherein the type information specifies that the at least one business object is to manifest as one of a billing address object and a service address object.

11. The method of claim 9 further comprising sending the business object to a requesting consumer device based on manifesting the business object.

12. The method of claim 1, further comprising: preventing the user from accessing the selected portions of the defined information outside the one or more time periods when the user is permitted to access the selected portions of the defined information.

13. The method of claim 1, further comprising defining a context component of the business object, wherein defining information of the service includes defining the context component.

* * * * *